(12) United States Patent
Stratmann et al.

(10) Patent No.: US 12,268,295 B2
(45) Date of Patent: Apr. 8, 2025

(54) PERSONAL CARE SYSTEM

(71) Applicant: Braun GmbH, Kronberg (DE)

(72) Inventors: Martin Stratmann, Kelkheim (DE); Matthias Schiebahn, Bad Camberg (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 17/872,374

(22) Filed: Jul. 25, 2022

(65) Prior Publication Data

US 2023/0030640 A1    Feb. 2, 2023

(30) Foreign Application Priority Data

Jul. 28, 2021 (EP) .................... 21188142

(51) Int. Cl.
*A46B 15/00* (2006.01)
*G06F 3/04842* (2022.01)
*H04M 1/72409* (2021.01)

(52) U.S. Cl.
CPC ...... *A46B 15/0022* (2013.01); *G06F 3/04842* (2013.01); *H04M 1/72409* (2021.01)

(58) Field of Classification Search
CPC ........... A46B 15/0022; G06F 3/04842; H04M 1/72409
See application file for complete search history.

(56) References Cited

U.S. PATENT DOCUMENTS

| | | | |
|---|---|---|---|
| 4,880,382 A | 11/1989 | Moret et al. | |
| 10,044,801 B1 * | 8/2018 | Tyurumov | H04L 67/1095 |
| 10,588,400 B2 * | 3/2020 | Straka | A47K 7/043 |
| 2002/0132610 A1 * | 9/2002 | Chaplin | H04M 1/72427 455/414.1 |
| 2007/0136964 A1 | 6/2007 | Dawley | |

(Continued)

FOREIGN PATENT DOCUMENTS

| CN | 1371261 A | 9/2002 |
|---|---|---|
| CN | 101102697 A | 1/2008 |

(Continued)

OTHER PUBLICATIONS

Extended EP Search Report and Written Opinion for 21188142.0 dated Jan. 10, 2022, 07 pages.

(Continued)

*Primary Examiner* — Mahelet Shiberou
(74) *Attorney, Agent, or Firm* — Jay A. Krebs

(57) ABSTRACT

A personal care system has a personal care device including a memory unit, a display unit, a first wireless communication unit, and a separate input device comprising a second wireless communication unit arranged for wireless communication with the first wireless communication unit. The separate input device is arranged for allowing a user to provide text data or picture data or for selecting text data or picture data from a database, wherein the separate input device is arranged to wirelessly send the provided or selected text or picture data to the personal care device, which is arranged to receive the wirelessly sent data and to store that into a memory of the memory unit and to use the received data in replacement of previously stored default text data or picture data for user communication on the display unit.

20 Claims, 2 Drawing Sheets

(56) References Cited

U.S. PATENT DOCUMENTS

| | | | |
|---|---|---|---|
| 2007/0247552 A1* | 10/2007 | Choi | G06T 3/40 |
| | | | 348/569 |
| 2009/0092955 A1* | 4/2009 | Hwang | G16H 20/40 |
| | | | 434/263 |
| 2009/0178217 A1 | 7/2009 | Reiter et al. | |
| 2011/0275424 A1* | 11/2011 | Schmid | A46B 15/0002 |
| | | | 15/22.1 |
| 2014/0033034 A1 | 1/2014 | Patel | |
| 2017/0095070 A1* | 4/2017 | Machiorlette | A46B 15/001 |
| 2020/0193867 A1* | 6/2020 | Davis | A61C 17/22 |

FOREIGN PATENT DOCUMENTS

| | | |
|---|---|---|
| CN | 101355891 A | 1/2009 |
| CN | 101454055 A | 6/2009 |
| CN | 101534745 A | 9/2009 |
| CN | 101557774 A | 10/2009 |
| WO | 2007112112 A1 | 10/2007 |
| WO | 2011140008 A2 | 11/2011 |
| WO | 2014016718 A1 | 1/2014 |

OTHER PUBLICATIONS

PCT Search Report and Written Opinion for PCT/IB2022/056838 dated Oct. 12, 2022, 09 pages.
All Office Actions: U.S. Appl. No. 12/775,862, filed May 7, 2010.

* cited by examiner

PERSONAL CARE SYSTEM

FIELD OF THE INVENTION

The present disclosure is concerned with a personal care system comprising a personal care device having a display unit on which text data and/or picture data can be shown for user communication and a separate input device that can wirelessly communicate with the personal care device.

BACKGROUND OF THE INVENTION

It is generally known that a personal care device such as an electric toothbrush can have a display on which text or graphics can be displayed for user communication. The Oral-B iO series electric toothbrushes are an example of such personal care devices. The Oral-B iO toothbrushes are arranged to show various information on the display such as a so-called welcome screen or icons indicating the currently chosen brushing mode. Text information is displayed together with graphics. It is also known that such a personal care device can be connected with a separate input device so that a personal care system is formed. E.g. the Oral-B iO electric toothbrushes can be connected with a smartphone on which the Oral-B App (a software application) can be installed so that additional functionality is enabled, e.g. the displaying of a live brushing feedback on the display of the smartphone.

It is an object to render such known personal care systems even more customizable and/or versatile.

SUMMARY OF THE INVENTION

In accordance with at least one aspect a personal care system is provided that comprises a personal care device having a memory unit, a display unit and a first wireless communication unit, and a separate input device comprising a second wireless communication unit arranged for wireless communication with the first wireless communication unit of the personal care device, the separate input device being arranged for allowing a user to provide text data or picture data or for selecting text data or picture data from a database, wherein the separate input device is arranged to wirelessly send the provided or selected text data or picture data to the personal care device and the personal care device is arranged to receive the wirelessly sent text data or picture data and to store the received text data or picture data into a memory of the memory unit and to use the received text data or picture data in replacement of previously stored default text data or picture data for user communication on the display unit.

In accordance with at least one aspect a method to operate a personal care system is provided that comprises the steps of:
  providing a personal care device having a memory unit and a display unit;
  storing default text data or picture data into a memory of the memory unit;
  providing a separate input device comprising an interface for allowing a user to provide or select text data or picture data that shall replace the default text data or picture data;
  wirelessly sending the provided or selected text data or picture data from the separate input device to the personal care device;
  receiving the provided or selected text data or picture data by the personal care device;
  storing the received text data or picture data in the memory of the memory unit, preferably into a dedicated memory segment;
  visualizing the received text data or picture data in replacement of the default text data or default picture data on a display of the display unit for user communication.

BRIEF DESCRIPTION OF THE DRAWINGS

The present disclosure will be further elucidated by a detailed description of example embodiments and with reference to figures. In the figures

DETAILED DESCRIPTION OF THE INVENTION

Figure 1:
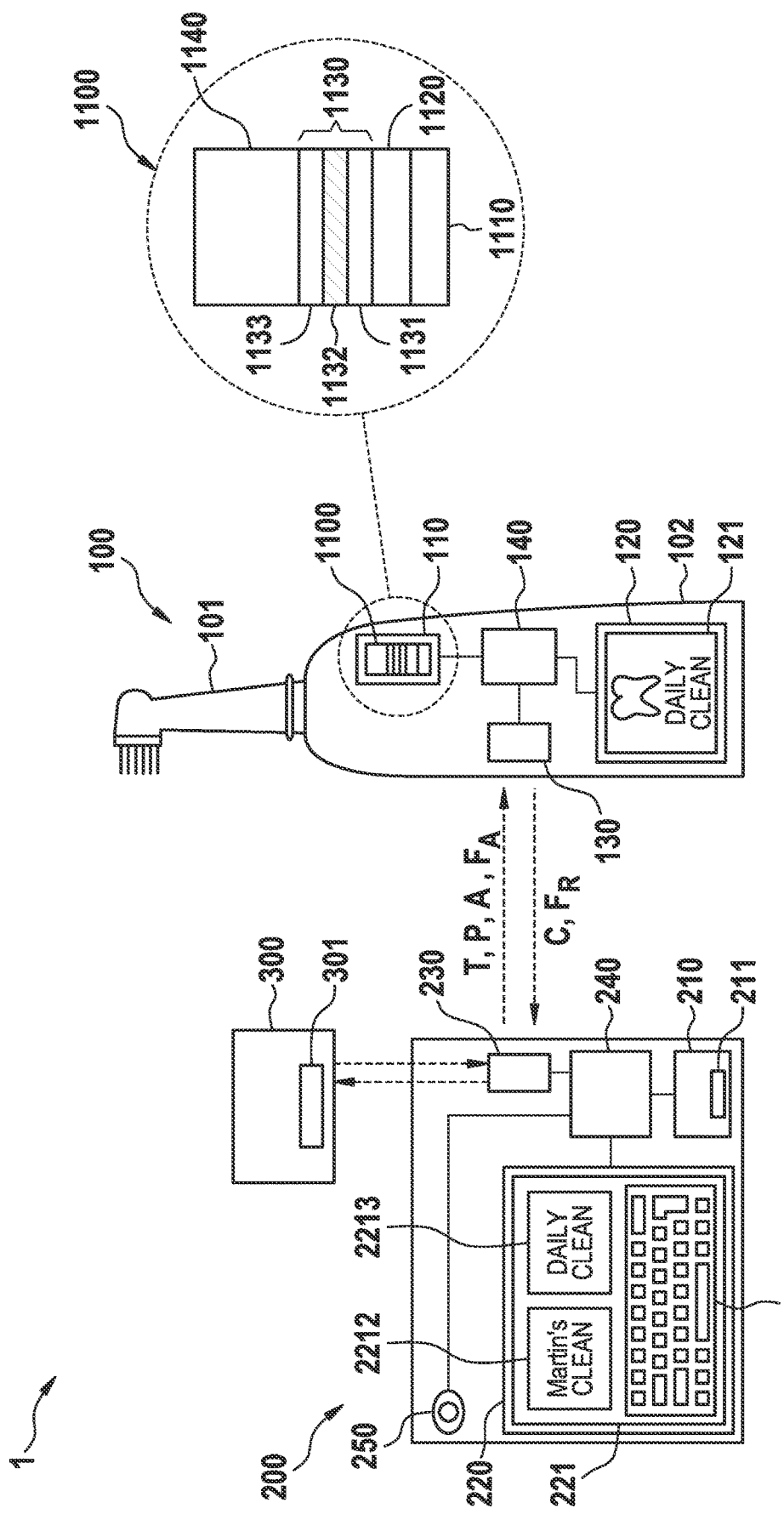
FIG. 1 is a schematic depiction of a personal care system in accordance with the present disclosure.

In the context of the present description "personal care" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health and on the other hand the cosmetic treatment and improvement of the appearance of the skin and its adnexa. It shall include the maintenance and strengthening of wellbeing. This includes skin care, hair care, and oral care as well as nail care. This further includes grooming activities such as beard care, shaving, and depilation. A "personal care device" thus means any device for performing such nurturing or grooming activity, e.g. (cosmetic) skin treatment devices such as skin massage devices or skin brushes; wet razors; electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal care device may have a more pronounced benefit in one or several of these nurturing or device areas than in one or several other of these areas. In the present description, an electric toothbrush was chosen to present details of the proposed personal care device, which shall be understood as not limiting. To the extent in which the details are not specific for an electric toothbrush, the proposed technology can be used in any other personal care device.

In accordance with the present disclosure, a personal care system comprises at least one personal care device and at least one input device that is separate from the at least one personal care device. The separate input device is arranged for wireless communication with the personal care device, where the communication may be unidirectional (i.e. the communication channel allows data flow from the separate input device to the personal care device) but preferably is bi-directional, i.e. the communication channel allows data flow from the separate input device to the personal care device and also from the personal care device to the separate input device. Without being limited by theory, the separate input device may also be arranged for communication, whether unidirectional or bi-directional and whether wireless or wired, with other devices and/or the Internet and/or a cloud computer/server, e.g. via a Bluetooth or a Wi-Fi protocol. Just for sake of differentiation, the personal care device comprises a wireless communication unit that is called "first wireless communication unit" and the separate input device has a wireless communication circuit that is called "second wireless communication unit". This shall not exclude that the personal care device and/or the separate input device have further communication units and this terminology shall not imply any order of the wireless communication units.

The description of the separate input device herein focuses on the use of the separate input device to provide or select text data or picture data. This shall not exclude that the separate input device provides additional functionality such as live brushing feedback, storage of brushing data etc. as is already known from, e.g., the Oral-B App running on a smartphone.

The personal care device comprises a display unit having a display such as a TFT display or an LED display (including but not limited to regular LED, OLED, AMOLED, MicroLED, QLED etc.), but typically a display having an M times N matrix of individually controllable display elements ("display pixels" or just "pixels"), where in some embodiments a single display element comprises several light emission elements, e.g. a single LED display pixel may comprise three differently colored LEDs, for example an R-LED, a G-LED and a B-LED. This shall not rule out that the display may be realized as an LCD display or a segment display and shall in particular not be interpreted as limiting as more complex sub-pixel geometries like PenTile arrangements (RGBG) shall be covered as well. The display unit may comprise further components like a support on which the display itself is mounted and/or a display controller.

The personal care device further comprises a memory unit having a memory for storing at least one default text data and/or default picture data to be visualized on the display for user communication, e.g. graphics or an icon and/or a name that may relate to at least one operation mode or to a welcome screen or the like. The memory unit may comprise further components such as a memory manager. In the present disclosure, the terms "picture data" or "image data" or "graphics data" are used interchangeably and these terms refer to a set of digital data that directly or indirectly (e.g. after a processing step) is used for visualizing graphics on a display. Such picture data may thus be present in any standardized or proprietary format, whether applying lossless or lossy compression or no compression at all, such as JPEG, PDF, TIFF, BMP, PNG etc. In some embodiments, default graphic data and/or default text data are stored in the memory of the memory unit for a plurality of different modes and/or for a plurality of different communication screens of the personal care device. E.g. for an electric toothbrush, an operation mode may be named "Daily Clean" and the graphics/icon related to this operation mode may be a stylized tooth. The icon together with the text may then be displayed on the display when the respective operation mode is selected by the user to inform the user about the chosen operation mode (in the present disclosure, the terms "operation mode" and "mode" are used interchangeably). While it is here differentiated between text data and graphic data, it shall be understood that text data that is displayed on the display unit of the personal care device may be stored as bitmap data or generally as picture data, but in some embodiments, text data may mean plain text information such as the name of the user, e.g., "Matthias", and such text data may be stored as ASCII or ISO 10646 (Unicode) text information and an image converter may then create picture data representing the text data "John" for the act of displaying the text information. For sake of clarity, a phrase used herein like "default text data or picture data" shall be understood in a way the "default" refers to the "text data" as well as to the "picture data".

A personal care device in accordance with the present disclosure is arranged to display at least one default picture data or a least one default text data on the display of the display unit. It shall be understood that the personal care device, preferably the display unit or a control unit may be arranged to convert text data into picture data so that the text data is displayed in the same manner as picture data. The default text data may be a simple word like "Welcome" or "Hello". The default picture data may be a stylized sunrise or a star symbol together with a word like "Welcome" etc. These are of course just a few examples and it shall be understood that the variability of, e.g., picture data is only limited by the number of display pixels and the respective color depth, e.g. the display may have an M times N pixel matrix such as a 96 times 64 pixel matrix or a 1080 times 720 pixel matrix, and the available color depth may be 1 bit for monochromatic pictures or 8-bit for gray scale pictures or 24-bit for true color pictures. While it was mentioned that the personal care device may display a so-called welcome screen by displaying default welcome text data and/or default welcome picture data, this shall not be understood as limiting. Instead, the personal care device may be arranged to only display a good-bye screen (prior to a switching-off of the personal care device) or to display a plurality of default text data and/or picture data under different circumstances, e.g. a morning screen for morning times (e.g. between 4 am to 10 am) and an evening screen for evening times (e.g. between 5 pm and 11 pm). E.g. the personal care device may comprise a menu for setting of operation parameters comprising several screens to be shown on the display and/or a menu for selecting of an operation mode where successively picture data for indicating different modes provided by the personal care device may be shown on the display—in case of an electric toothbrush one mode may be a regular cleaning mode and a shining tooth may be displayed and a second mode may be a sensitive mode and a feather may then be displayed.

In accordance with at least one aspect, the personal care system in accordance with the present disclosure is arranged to allow a user to change at least the one default text data and/or at least the one default picture data so that the user can customize what is being displayed. E.g. referring to an electric toothbrush again, one mode of the toothbrush may be "Tongue Cleaning" and the default picture data associated with it may be a stylized tongue. But the user may prefer to use a customized image instead of the default stylized tongue, e.g. the user may want to use a picture of her dog with the tongue hanging out. Similarly, if a mode of the toothbrush is called "Daily Clean" and the default text data associated with it results in the words "Daily Clean" being displayed, the user may prefer to rename the mode by providing text data that instead results in the words "Martin's Clean" being displayed.

The separate input device comprises a second wireless communication unit and optionally a display unit, a processor, and/or a memory unit. The separate input device is arranged to allow a user to provide or select text data or picture data, which provided or selected text data or picture data can then be sent to the personal care device (or be downloaded by the personal care device). The personal care device may regularly or irregularly check with the separate input device whether such provided or selected text data or picture data is available for download and may then initiate the transmission, e.g. such a check may occur every time the personal care device is switched on and a communication with the separate input device is established. Alternatively or additionally, the separate input device may send a download availability information, e.g. a respective flag as part of a standardized or proprietary communication protocol, so that the personal care device is informed about provided or selected text data or picture data that can be downloaded. The personal care device may then itself check whether it has the possibility to store such text data or picture data (e.g. whether there is a non-corrupt dedicated memory segment available for storing) and may the send the download readiness information, e.g. again a respective flag, to initiate the data transfer.

The separate input device may comprise an interface allowing the user to interact with the separate input device and to provide or select text data or picture data. The interface may be a keyboard or a touch-sensitive display or one or a plurality of buttons or switches or other user-operable control elements. This shall not exclude that the interface may be arranged as a voice-controlled interface or a combination of generally known user-device interface elements. The separate input device may comprise a camera or may be connectable with a camera to allow a user to take a picture to provide picture data. The separate input device may in particular convert a picture taken by such a camera or provided by another method (e.g. by selection from a picture database) into picture data having the data format required by the personal care device. This shall not exclude that the personal care device may be arranged to perform such conversion, but it may be sensible to have such more processing-power related tasks done by a processor in the separate input device. As was already indicated, the separate input device may itself comprise a database or may be connectable with a separate database (e.g. on a storage device in the home environment or on a remote computer/server or on a cloud computer/server etc.), which database comprises at least one text data or one picture data that can be selected by the user. Typically, such a database comprises a plurality of text data and/or picture data from which the user can select. The manufacturer or distributor of the personal care device may offer such a database with a large variability of selectable picture data and/or text data. The personal care system may then be arranged to only allow the manufacturer-provided picture data and/or text data to replace the default picture data and/or text data. By such a closed system, the manufacturer can avoid that picture data and/or text data is used that does not comply with the manufacturer's standards.

The separate input device may be arranged to request the input of associated data from the user in order to assign the provided or selected text data or picture data to one of a plurality of default text data or picture data. The default text data or picture data may be stored in a dedicated protected memory segment of the memory of the memory unit of the personal care device and may have been stored there by the manufacturer, e.g. during the manufacturing process. For example, the separate input device may allow the user to choose one from a plurality of available default picture data and/or text data to identify the default picture data and/or text data that should be replaced by provided or selected picture data and/or text data.

The separate input device may be a proprietary device offered by the manufacturer of the personal care device as a system package comprising the personal care device and the separate input device. Alternatively or additionally, the manufacturer may offer the separate input device independent from the personal care device to allow a user to upgrade the personal care device and to enable the herein discussed added functionality. Instead of using a dedicated separate input device, the separate input device may be realized by a software application (e.g. an App that can be downloaded) running on a generic device such as a smart watch or a mobile phone or smartphone or a tablet or a laptop or notebook or desktop computer or a game console etc.

In accordance with some aspects, the personal care device and/or the separate input device may comprise an embedded system, e.g. the memory unit and the control unit (and/or further components such as input or output devices) of the personal care device may be realized by an embedded system (which may comprise a system on a chip—SoC). An embedded system typically has a cost-efficient set-up. The memory of the memory unit (or at least a portion of the memory) may then be realized as a flash memory, in particular as a serial flash memory—even though it shall be understood that the use of a flash memory or a serial flash memory is not necessarily bound to the use of an embedded system. Such a flash-type memory (whether part of an embedded system or not) typically comprises protected memory segments in which non-changeable content is stored such as the program code or default files such as the previously mentioned default text data and/or default picture data. A dedicated memory segment of the memory of the memory unit may be identified for storing customized files such as user provided or user selected text data and/or picture data. The memory may be prone to failure in the read/write processes and also the memory itself may become corrupted. While such failures are not expected to occur often but only rather seldomly, certain measures need to be taken to avoid product disappointment by a user. Once provided or selected text data or picture data is received by the personal care device and/or stored into the dedicated memory segment, a control unit of the personal care device may perform a consistency check such as a cyclic redundancy check (CRC) on the received and/or stored text data or picture data. If this consistency check results in a confirmed data consistency or in case an identified inconsistency could be corrected by the consistency check routine, the respective received text data or picture data will be used instead of the default text data or picture data stored in the protected memory segment. In case of a plurality of available default text data or picture data, the respective default text data or picture data to be replaced is identified by the additional data that was requested from the user and which is received as well, i.e. will be sent by the separate input device. The control unit of the personal care device may then be arranged to only use the received text data or picture data for visual user communication on the display.

The personal care system may be arranged to allow a replacement of the user provided or selected text data or picture data via the separate input device. The respective received text data or picture data in the dedicated memory segment of the memory will then be overwritten if such new provided or selected text data or picture data is received.

In case the mentioned consistency check fails, in particular fails a predetermined number of times, e.g. once, twice, thrice etc., the respective received text data or picture data stored in the dedicated memory segment is marked as corrupt and the control unit of the personal care device will revert back to the default text data or picture data. If the received and stored text data or picture data is replaced by new received text data or picture data and in case the consistency check fails again, the stored text data or picture data will again be marked as corrupt and a parameter indicative of the memory area corruption level will be increased, e.g. incremented by 1. The initial value of this parameter may be zero. The term "memory area" here means a block or page of the dedicated memory segment in which the received text data or picture data is stored and which block or page is identified by a starting address. In case the parameter indicating the memory area corruption level reaches a certain threshold, e.g. one or two or three or five or ten etc., the complete memory area will be marked as corrupt. The respective memory area will then be blocked for further read and/or write operations. In case that all memory areas (in case there are more than one) of the dedicated memory segment for storing of received text data or picture data are marked as corrupt, the personal care device, preferably a control unit of the personal care device may be arranged to inhibit any further download of provided or selected text data or picture data from the separate input device.

FIG. 1 is a schematic depiction of an example personal care system 1 in accordance with the present description. The personal care system 1 comprises a personal care device 100, here depicted as an electric toothbrush, which shall be understood as a non-limiting example, and a separate input device 200. The personal care device 100 may comprise a head section 101, e.g., a replacement brush head, and a handle section 102. The personal care device 100 here comprises a memory unit 110, a display unit 120, a first wireless communication unit 130 and a control unit 140 that is coupled with the other units.

The memory unit 110 comprises a memory 1100 that is also schematically shown in a magnification of its separation into memory segments. The memory 1100 here comprises various memory segments, namely a protected memory segment 1110 for program code, a protected memory segment 1120 for default text data or picture data, a dedicated memory segment 1130 for storing received text data or picture data and a free memory segment 1140 for intermediate storage or other purposes. The size of the segments is not to be understood as limiting. The dedicated memory segment 1130 is itself segmented into several memory areas 1131, 1132, 1133, where the number of memory areas shown here shall be understood as not being limiting. As was described already, the memory areas 1131, 1132, 1133 may individually be marked as being corrupt in case of inconsistency checks of text data and/or picture data has failed a certain number of times—this is indicated by a shading of memory area 1132.

The display unit 120 comprises a display 121 for visualization of user communication. In FIG. 1 it is shown by way of an example that a currently set mode of the personal care device 100 is a "DAILY CLEAN" mode that is additionally indicated by a stylized tooth. The stylized tooth may be the visualization of default picture data relating to this particular mode and the text "DAILY CLEAN" may be the visualization of the default text data relating to this particular mode. This example is of course not to be understood as limiting. Neither the picture content nor the text content is relevant and just shown as an example. Specifically, in some embodiments the default picture data comprises the pictorial visualization of the text data. But to allow a user to customize either one of the default text data or picture data or both, it may be sensible to distinguish the default picture data from the default text data. As was explained in a previous paragraph, the separate input device 200 or the personal care device 100 may be arranged to convert text data into picture data so that the text data is stored as picture data. The display 121 may have a certain size, e.g. the display may comprise a matrix of 96 times 64 pixels, and the picture data may have a size of 64 times 64 pixels and may always be visualized in the top 64 pixel rows, while the text data may be stored as 64 times 32 picture data and may then always be visualized in the bottom 32 pixel rows. Neither this example nor the pixel resolution of the display 121 mentioned here shall be understood as limiting. Other display resolutions and other visualization concepts, in particular less fixed visualization concepts may be used.

The first wireless communication unit 130 is arranged for unidirectional (receiving) and preferably bi-directional (transmitting and receiving) wireless data transfer.

The separate input device 200 here comprises a memory unit 210, a display unit 220, a second wireless communication unit 230, a processor 240 and a (optional) camera 250. The optional memory unit 210 may comprise a database 211 of selectable text data and/or picture data. The display unit 220 comprises a display 221 that may be used to visualize text data and/or picture data so that a user can select the shown text data and/or picture data as replacement for default text data and/or picture data used on the personal care device 100. In the shown example, the text data "Martin's CLEAN" is visualized as text data selected by a user in a portion 2212 of the display 221. As was described in a previous paragraph, the separate input device 200 may comprise an interface allowing the user to interact with the separate input device 200 (e.g. with the processor 240) in order to provide or select text data or picture data. In the shown example, a portion 2211 of the here touch sensitive display 221 is realizing a touch sensitive keyboard to provide an interface. The user may thus provide text data by, e.g., typing "Martin's CLEAN", which may then be visualized in display portion 2212. The processor 240 may use a predefined or selectable font style and may convert the provided text data into picture data having the data format as required by the personal care device 100. The interface may be arranged to allow the user to set various parameters like text color, background color, font size etc. To pursue the example given above, the provided text data may be converted into a 64 times 32 pixel picture having, e.g., a 4 bit color depth. In FIG. 1 it is shown that another portion 2213 of the display 221 visualizes the default text data that is to be replaced. In order to visualize this default text data, the user may have been requested to input associated data to identify the default text data that is to be replaced, e.g. in case of five available default text data on the personal care device, the user may have indicated that he first of these five default text data files are to be replaced.

As picture data cannot be as simply provided by the user as text data, the database 211 may comprise a plurality of picture data from which the user can select or the user may use a camera, e.g. a camera 250 of the separate input device 200 or a separate camera that may be connectable with the separate input device 200, to provide picture data. The processor 240 may be arranged to convert provided picture data into a format that is required by the personal care device 100, e.g. to again pursue the above example, the provided picture data may be converted into a 64 times 64 pixel picture with, e.g., a 12 bit color depth. Instead of using the (optional) internal data base 211, the separate input device 200 and specifically the second wireless communication unit 230 may be arranged to connect with a separate or remote device 300 comprising a database 301 with a plurality of picture data and/or text data from which the user can select. The separate or remote device 300 may be a device that is part of the home environment of the user (e.g. a router or a computer or a RAID storage etc.) or it may be a remote computer/server or a cloud computer/server.

Once provided or selected, the respective text data or picture data may be stored in the memory unit 210 of the separate input device 200 as downloadable text data or picture data, optionally together with associated data identifying the default text data or picture data to be replaced.

In some examples, the control unit 140 of the personal care device 100 regularly or irregularly checks with the separate input device 200 whether provided or selected text data or picture data is available for download, e.g. the personal care device 100 may check for downloadable text data or picture data every time a communication between the personal care device 100 and the separate input device 200 is established. Additionally or alternatively, the separate input device 200 may send a download availability information such as a flag $F_A$ to the personal care device 100. The control unit 140 may send a download readiness flag $F_R$ via the first wireless communication unit 130 to indicate that it is waiting for the transmission of downloadable text data and/or picture data. The personal care device 100 may have upfront checked that it has an uncorrupted dedicated memory area for storing of the received text data or picture data. As was explained, the size of the provided or selected text data or picture data may be pre-determined based on a predetermined resolution and color-depth. Once the separate input device 200 has received the download readiness flag $F_R$ via the second wireless communication unit 230, it will initiate the sending of the provided or selected text data or picture data, which may happen in any known manner by applying a standardized or a proprietary communication protocol, e.g. a Bluetooth protocol. Text data T, picture data P and potentially also associated data A are then transmitted to the personal care device 100, where the respective text data or picture data and potentially the associated data is received. The control unit 140 may be arranged to store the received text data or picture data into the dedicated memory segment 1130 of the memory 1100.

Figure 2:
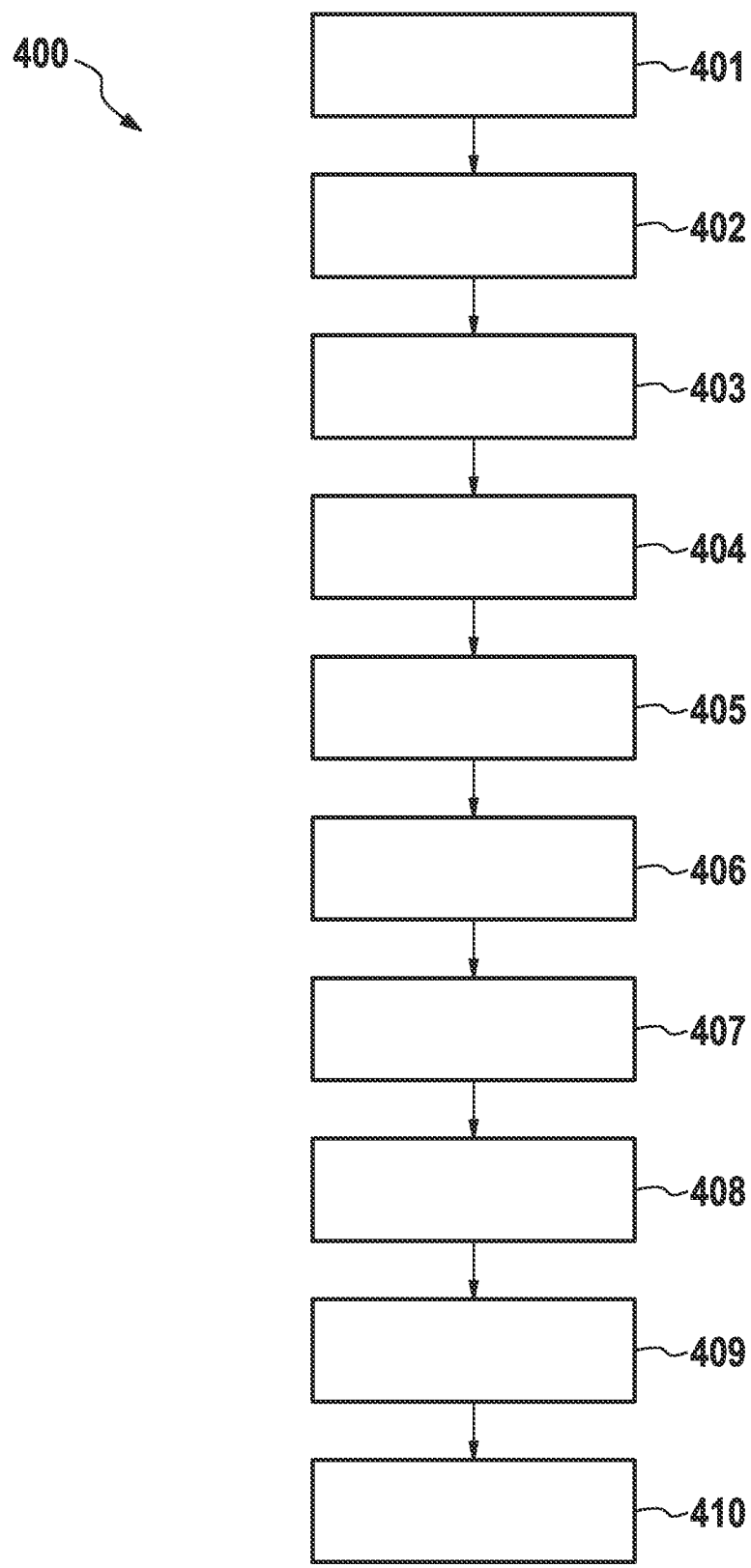
FIG. 2 is a method step chart exemplifying a method of operating a personal care system in accordance with the present disclosure.

FIG. 2 depicts a diagram 400 indicating steps of a method of operating a personal care system in accordance with the present disclosure. An example method of operating a personal care system comprises the steps of

- providing a personal care device having a memory unit and a display unit for visualizing user communication—step 401;
- storing at least one of a default picture data and text data to be visualized on a display of the display unit of a personal care device into a memory of the personal care device, preferably into a protected memory segment of the memory—step 402;
- providing an interface on a separate input device allowing a user to provide or select picture data or text data for replacing the default picture data or text data—step 403;
- optionally requesting via the interface the input of associated data to assign the provided or selected text data or picture data to one of a plurality of default text data or picture data—step 404;
- optionally providing a database comprising a plurality of picture data or text data and coupling the database with the interface—step 405;
- wirelessly sending the provided or selected picture data or text data from the separate input device to the personal care device—step 406;
- optionally sending a download readiness information from the personal care device to the separate input device and/or checking by the personal care device with the separate input device whether provided or selected picture data or text data is available for sending prior to the step of sending the provided or selected picture data or text data and/or sending of a download availability information from the separate input device to the personal care device to indicate the availability of provided or selected text data or picture data for download—step 407;
- receiving the sent picture data or text data by the personal care device and storing it into a memory of the memory unit of the personal care device, preferably storing it into a dedicated memory segment of the memory—step 408;
- optionally performing a consistency check on the received and stored picture data or text data and marking the respective picture data or text data as corrupt if the consistency check has failed a predetermined number of times—step 409;
- visualizing the received picture data or text data instead of the respective default picture data or text data on the display for user communication—step 410.

The above method may also optionally include one or more of the following steps:

- performing a consistency check of the received text data or picture data and of marking the received text data or picture data as corrupt if the consistency check has failed a predetermined number of times and thus inhibiting the use of the received text data or picture data and reverting back to visualizing the default text data or picture data;
- receiving new text data or picture data to replace the previously received text data or picture data and storing the new received new text data or picture data into the dedicated memory segment, and performing a consistency check of the received new text data or picture data and incrementally increasing a parameter indicative of a memory area corruption level if the consistency check fails a predetermined number of times as well as marking the received new text data or picture as corrupt;
- marking the block or page of the dedicated memory segment in which the received text data or picture data is stored as corrupt if the parameter indicating the memory area corruption level was increased a predetermined number of times;
- inhibiting the download of any further text data or picture data from the separate input device if all blocks or pages of the dedicated memory segment are marked as corrupt.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A personal care system comprising
a personal care device having a memory unit, a display unit and a first wireless communication unit,
the memory unit comprising a memory, the memory storing default text data or picture data;
a separate input device comprising a second wireless communication unit arranged for wireless communication with the first wireless communication unit of the personal care device, the separate input device being arranged for allowing a user to provide text data or picture data or for selecting text data or picture data from a database,
wherein the separate input device comprises an interface allowing the user to interact with the separate input device in order to provide or select text data or picture data;
wherein the separate input device is arranged to wirelessly send the provided or selected text data or picture data to the personal care device and the personal care device is arranged to receive the wirelessly sent text data or picture data and to store the received text data or picture data into the memory of the memory unit and to use the received text data or picture data in replacement of the previously stored default text data or picture data for user communication on the display unit.

2. The personal care system of claim 1, wherein the separate input device is arranged to request the input of associated data that assigns the provided or selected text data or picture data to one of a plurality of default text data or picture data previously stored in the memory of the personal care device, which default text data or picture data shall be replaced by the provided or selected text data or picture data.

3. The personal care system of claim 1, wherein the separate input device is arranged to convert the provided or selected text data into picture data having a data format as required by the personal care device.

4. The personal care system of claim 1, wherein the interface-provided on the separate input device is arranged for wired or wireless connection with a separate or remote device comprising the database.

5. The personal care system of claim 1, wherein the separate input device comprises a camera for creating picture data.

6. The personal care system of claim 1, wherein the personal care device comprises a control unit that is arranged to check whether provided or selected text data or picture data is available for download from the separate input device and to provide a download readiness information such as a flag to the separate input device and the separate input device is arranged to initiate sending of the provided or selected text data or picture data to the personal care device once the download readiness information is received.

7. The personal care system of claim 1, wherein the memory unit has a dedicated memory segment for storing the received text data or picture data.

8. The personal care system of claim 7, wherein the dedicated memory segment for storing received text data or picture data is realized as a serial flash memory.

9. The personal care system of claim 7, wherein the personal care device has a control unit arranged to perform a consistency check on the received text data or picture data.

10. The personal care system of claim 9, wherein the control unit is arranged to mark the stored received text data or picture data as corrupt in case the consistency check has failed a predetermined number of times and to use the associated default text data or picture data instead of the received text data or picture data for user communication on the display unit.

11. The personal care system of claim 10, wherein the control unit is arranged to mark a portion such as a block or a page of the dedicated memory segment as corrupt if a consistency check of received text data or picture data stored in that portion of the dedicated memory segment has failed a predetermined number of times, wherein if the received text data or picture data had been replaced for a predetermined number of times by newly received text data or picture data and the consistency check has always failed.

12. The personal care system of claim 11, wherein the control unit is arranged to mark the dedicated memory segment as corrupt when all portions of the dedicated memory segment were marked as corrupt and the control unit is arranged to then inhibit the further download of text data or picture data from the personal care device and to always access the default text data or picture data.

13. The personal care system of claim 5, wherein the separate input device is selected from the group consisting of a mobile phone, a smart phone, and a tablet computer.

14. The personal care system of claim 7, wherein the memory unit is part of an embedded system.

15. The personal care system of claim 1, wherein the interface of the separate input device comprises a keyboard, a touch-sensitive display, one or a plurality of buttons or switches, a voice-controlled interface, or a combination thereof.

16. The personal care system of claim 1, wherein the personal care device is an electric toothbrush.

17. A method of operating a personal care system comprising the steps of
providing a personal care device having a memory unit and a display unit;
storing default text data or picture data into a memory of the memory unit;
providing a separate input device comprising an interface for allowing a user, via the interface, to provide or select text data or picture data that shall replace the default text data or picture data;
wirelessly sending the provided or selected text data or picture data from the separate input device to the personal care device;
receiving the provided or selected text data or picture data by the personal care device;
storing the received text data or picture data in the memory of the memory unit;
visualizing the received text data or picture data in replacement of the default text data or default picture data on a display of the display unit for user communication.

18. A method of claim 17, comprising the step of requesting the input of associated data via the interface for assigning the provided or selected text data or picture data to one of a plurality of default text data or default picture data previously stored in the memory of the memory unit.

19. A method of claim 17, comprising the step of storing the received text data or picture data into a serial flash memory realizing the memory of the memory unit.

20. The method of claim 17, wherein the interface of the separate input device comprises a keyboard, a touch-sensitive display, one or a plurality of buttons or switches, a voice-controlled interface, or a combination thereof.

\* \* \* \* \*